US012148257B2

(12) United States Patent
Ranganath et al.

(10) Patent No.: US 12,148,257 B2
(45) Date of Patent: Nov. 19, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventors: Kris Ranganath, Sacramento, CA (US); Rody Bagtes, Sacramento, CA (US); Kannan Veeranan Gandhi, Sacramento, CA (US); Arun Chandrasekaran, Sacramento, CA (US)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 17/914,439

(22) PCT Filed: Apr. 2, 2021

(86) PCT No.: PCT/JP2021/014303

§ 371 (c)(1),
(2) Date: Sep. 26, 2022

(87) PCT Pub. No.: WO2021/206014

PCT Pub. Date: Oct. 14, 2021

(65) Prior Publication Data

US 2023/0117261 A1 Apr. 20, 2023

Related U.S. Application Data

(60) Provisional application No. 63/006,475, filed on Apr. 7, 2020.

(51) Int. Cl.
*G07C 9/15* (2020.01)
*G07C 9/37* (2020.01)

(52) U.S. Cl.
CPC ................. *G07C 9/15* (2020.01); *G07C 9/37* (2020.01)

(58) Field of Classification Search
CPC ........ G07C 9/15; G07C 9/37; G07C 9/00563; G06K 9/00288; G06K 9/209; H04N 5/247
See application file for complete search history.

(56) References Cited

U.S. PATENT DOCUMENTS

2018/0047230 A1 2/2018 Nye
2019/0213816 A1* 7/2019 Grigorov .............. H04N 23/11

FOREIGN PATENT DOCUMENTS

CN 110189449 A 8/2019
JP 2007-303239 A 11/2007
(Continued)

OTHER PUBLICATIONS

European Search Report for EP Application No. 21784932.2, dated on Aug. 22, 2023.
(Continued)

*Primary Examiner* — Vernal U Brown
(74) *Attorney, Agent, or Firm* — Sughrue Mion, PLLC

(57) ABSTRACT

A gate apparatus includes a memory storing one or more instructions; and a processor configured to execute the one or more instructions to: obtain an image including a plurality of persons captured by one or more cameras, each of the plurality of persons present at a first area in advance of a barrier, process the image to determine whether each of the plurality of persons at the first area is authorized to proceed through the barrier and control the barrier, based on a status that the plurality of persons are identified as being authorized or unauthorized.

7 Claims, 10 Drawing Sheets

(56) References Cited

FOREIGN PATENT DOCUMENTS

| | | | |
|---|---|---|---|
| JP | 2008-071205 | A | 3/2008 |
| JP | 2009-199223 | A | 9/2009 |
| JP | 2009-205392 | A | 9/2009 |
| JP | 2014-219704 | A | 11/2014 |
| JP | 2015-001790 | A | 1/2015 |
| WO | 2014/109033 | A1 | 7/2014 |

OTHER PUBLICATIONS

Communication dated Jun. 6, 2023 issued by the Japanese Intellectual Property Office in counterpart Japanese Application No. 2022-560875.

International Search Report for PCT Application No. PCT/JP2021/014303, mailed on May 25, 2021.

Written opinion for PCT Application No. PCT/JP2021/014303, mailed on May 25, 2021.

* cited by examiner

INFORMATION PROCESSING APPARATUS, INFORMATION PROCESSING METHOD, AND STORAGE MEDIUM

This application is a National Stage Entry of PCT/JP2021/014303 filed on Apr. 2, 2021, which claims priority from U.S. Provisional Application 63/006,475 filed on Apr. 7, 2020, the contents of all of which are incorporated herein by reference, in their entirety.

TECHNICAL FIELD

The disclosure relates to an information processing apparatus, an information processing method, and a storage medium. More particularly, it relates to an information processing apparatus, an information processing method, and a storage medium for performing authentication of people using an image captured by a camera.

RELATED ART

Recently, a gate apparatus has been provided in facilities, such as airports, for controlling a passageway through which a user may walk, such as a security screening area. In the related art gate apparatus, a face authentication operation may be performed by comparing a face image acquired from a camera with a face image acquired from a registered image, such as a passport.

SUMMARY

According to one or more aspects of the disclosure, there is provided a gate apparatus, a control method of the gate apparatus, and a storage medium for allowing a user, such as passenger or a visitor.

According to an aspect of the disclosure, there is provided a system comprising: a memory storing one or more instructions; and a processor configured to execute the one or more instructions to: obtain an image including a plurality of persons captured by one or more cameras, each of the plurality of persons present at a first area in advance of a barrier; process the image to determine whether each of the plurality of persons at the first area is authorized to proceed through the barrier; and control the barrier, based on a status that the plurality of persons are identified as being authorized or unauthorized.

The processor may be further configured to execute the one or more instructions to: control the barrier, based on a determination that all of the plurality of persons are identified as being authorized, to be in an open state.

The processor may be further configured to execute the one or more instructions to: detect a first person, among the plurality of persons, by performing a facial recognition operation on the plurality of persons in the image captured at a first time from the one or more cameras; detect a first body region corresponding to a first face region of the first person; detect a second person, among the plurality of persons, by performing the facial recognition operation on the plurality of persons in the image; detect a second body region corresponding to a second face region of the second person; track the first body region and the second body region in another image captured by the one or more cameras at a second time subsequent to the first time; and control the barrier to remain open based on a determination that the first body region or the second body region is approaching the barrier.

The processor may be further configured to execute the one or more instructions to: control the barrier, based on a determination that at least one the plurality of persons is identified as being unauthorized, to be in a closed state.

The processor may be further configured to execute the one or more instructions to: detect a first person, among the plurality of persons, by performing a facial recognition operation on the plurality of persons in the image captured at a first time from the one or more cameras; detect a first body region corresponding to a first face region of the first person; detect a second person, among the plurality of persons, by performing the facial recognition operation on the plurality of persons in the image obtained from the one or more cameras; obtain another image of the first person at a second area based on the second person being identified as an unauthorized person, the second area being between the first area and the barrier; control the barrier to be in the open state based on the first person in the another image being identified as authorized by performing the facial recognition operation on the first person in the another image.

The image corresponding to the first area may be captured by a first camera, among the one or more cameras, and the another image corresponding to the second area may be captured by a second camera, among the one or more cameras.

The processor may be further configured to execute the one or more instructions to: obtain a first count value corresponding to a total number of persons identified in the first area from the image; obtain a second count value corresponding to a total number of persons in a second area different from the first area; and control the barrier to be in the closed state based on a mismatch between the first count value and the second count value.

The processor may be further configured to execute the one or more instructions to: determine a number of persons at a second area, the second area being closer than the first area to the barrier; determine, based on the number of persons being one, whether the one person at the second area is authorized to proceed through the barrier; control the barrier, based on a status that the one person as being authorized or unauthorized; and control the barrier to be closed based on the number of persons not being one.

The processor may be further configured to execute the one or more instructions to: determine a number of persons at a second area, the second area being closer than the first area to the barrier; determine, based on the number of persons being one, whether the one person at the second area was previously authorized to proceed through the barrier while at the first area; control the barrier, based on the one person being previously authorized to proceed through the barrier while at the first area; and control the barrier to be closed based on the number of persons not being one.

The system may further comprise: the barrier; and the one or more cameras.

According to another aspect of the disclosure, there is provided a method of controlling a barrier comprising: obtaining an image including a plurality of persons captured by one or more cameras, each of the plurality of persons present at a first area in advance of the barrier; processing the image to determine whether each of the plurality of persons at the first area is authorized to proceed through the barrier; and controlling the barrier, based on a status that the plurality of persons are identified as being authorized or unauthorized.

The controlling the barrier may further comprise: controlling the barrier, based on a determination that all of the plurality of persons are identified as being authorized, to be in an open state.

The method may further comprise: detecting a first person, among the plurality of persons, by performing a facial recognition operation on the plurality of persons in the image captured at a first time from the one or more cameras; detecting a first body region corresponding to a first face region of the first person; detecting a second person, among the plurality of persons, by performing the facial recognition operation on the plurality of persons in the image; detecting a second body region corresponding to a second face region of the second person; tracking the first body region and the second body region in another image captured by the one or more cameras at a second time subsequent to the first time; and controlling the barrier to remain open based on a determination that the first body region or the second body region is approaching the barrier.

The controlling the barrier may further comprise: controlling the barrier, based on a determination that at least one the plurality of persons is identified as being unauthorized, to be in a closed state.

The method may further comprise detecting a first person, among the plurality of persons, by performing a facial recognition operation on the plurality of persons in the image captured at a first time from the one or more cameras; detecting a first body region corresponding to a first face region of the first person; detecting a second person, among the plurality of persons, by performing the facial recognition operation on the plurality of persons in the image obtained from the one or more cameras; obtaining another image of the first person at a second area based on the second person being identified as an unauthorized person, the second area being between the first area and the barrier; and controlling the barrier to be in the open state based on the first person in the another image being identified as authorized by performing the facial recognition operation on the first person in the another image.

According to another aspect of the disclosure, there is provided a non-transitory computer readable medium having stored thereon one or more instructions to perform a method of controlling a barrier comprising: obtaining an image including a plurality of persons captured by one or more cameras, each of the plurality of persons present at a first area in advance of the barrier; processing the image to determine whether each of the plurality of persons at the first area is authorized to proceed through the barrier; and controlling the barrier, based on a status that the plurality of persons are identified as being authorized or unauthorized.

The controlling the barrier may further comprise: controlling the barrier, based on a determination that all of the plurality of persons are identified as being authorized, to be in an open state.

The method of the non-transitory computer readable medium may further comprise: detecting a first person, among the plurality of persons, by performing a facial recognition operation on the plurality of persons in the image captured at a first time from the one or more cameras; detecting a first body region corresponding to a first face region of the first person; detecting a second person, among the plurality of persons, by performing the facial recognition operation on the plurality of persons in the image; detecting a second body region corresponding to a second face region of the second person; tracking the first body region and the second body region in another image captured by the one or more cameras at a second time subsequent to the first time; and controlling the barrier to remain open based on a determination that the first body region or the second body region is approaching the barrier.

The controlling the barrier may further comprise: controlling the barrier, based on a determination that at least one the plurality of persons is identified as being unauthorized, to be in a closed state.

The method of the non-transitory computer readable medium may further comprise: detecting a first person, among the plurality of persons, by performing a facial recognition operation on the plurality of persons in the image captured at a first time from the one or more cameras; detecting a first body region corresponding to a first face region of the first person; detecting a second person, among the plurality of persons, by performing the facial recognition operation on the plurality of persons in the image obtained from the one or more cameras; obtaining another image of the first person at a second area based on the second person being identified as an unauthorized person, the second area being between the first area and the barrier; and controlling the barrier to be in the open state based on the first person in the another image being identified as authorized by performing the facial recognition operation on the first person in the another image.

DESCRIPTION OF EXAMPLE EMBODIMENTS

Figure 1A:
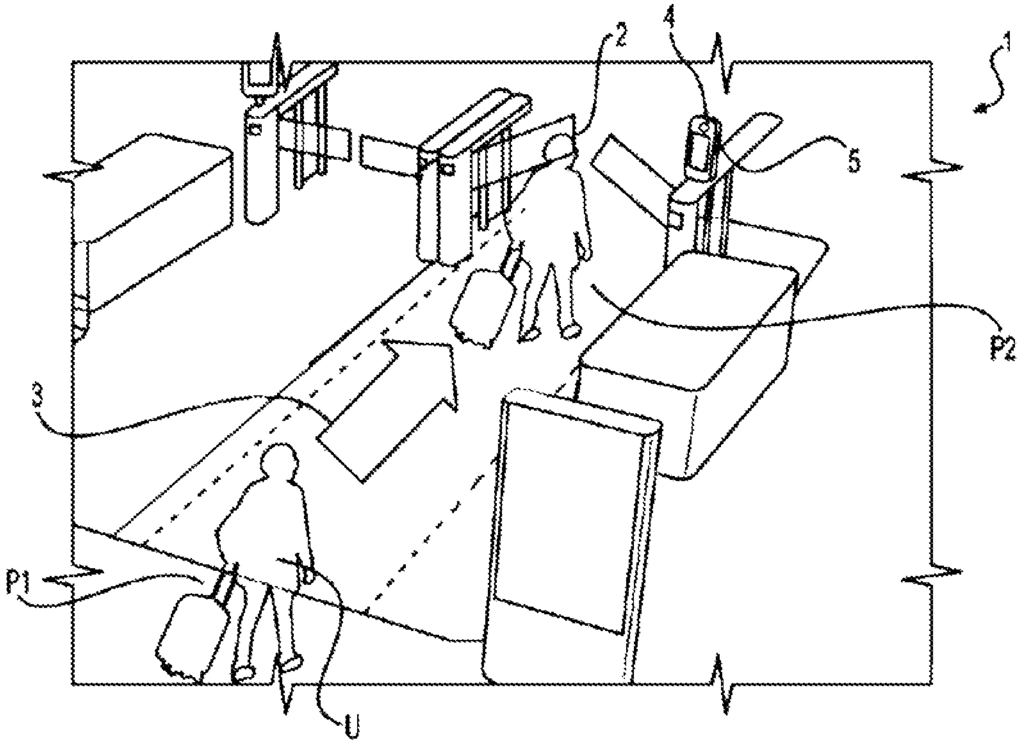
FIG. 1A illustrates an example of a gate apparatus according to an embodiment.

Example embodiments will now be described below in more detail with reference to the accompanying drawings. The following detailed descriptions are provided to assist the reader in gaining a comprehensive understanding of the methods, apparatuses, and/or systems described herein. However, the example embodiment provided in the disclosure should not be considered as limiting the scope of the disclosure. Accordingly, various changes, modifications, and equivalents of the systems, apparatuses and/or methods described herein will be suggested to those of ordinary skill in the art.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

One or more example embodiments of the disclosure will be described below with reference to the drawings. Throughout the drawings, the same components or corresponding components are labeled with the same reference numerals, and, accordingly, the description thereof may be omitted or simplified.

Figure 1B:
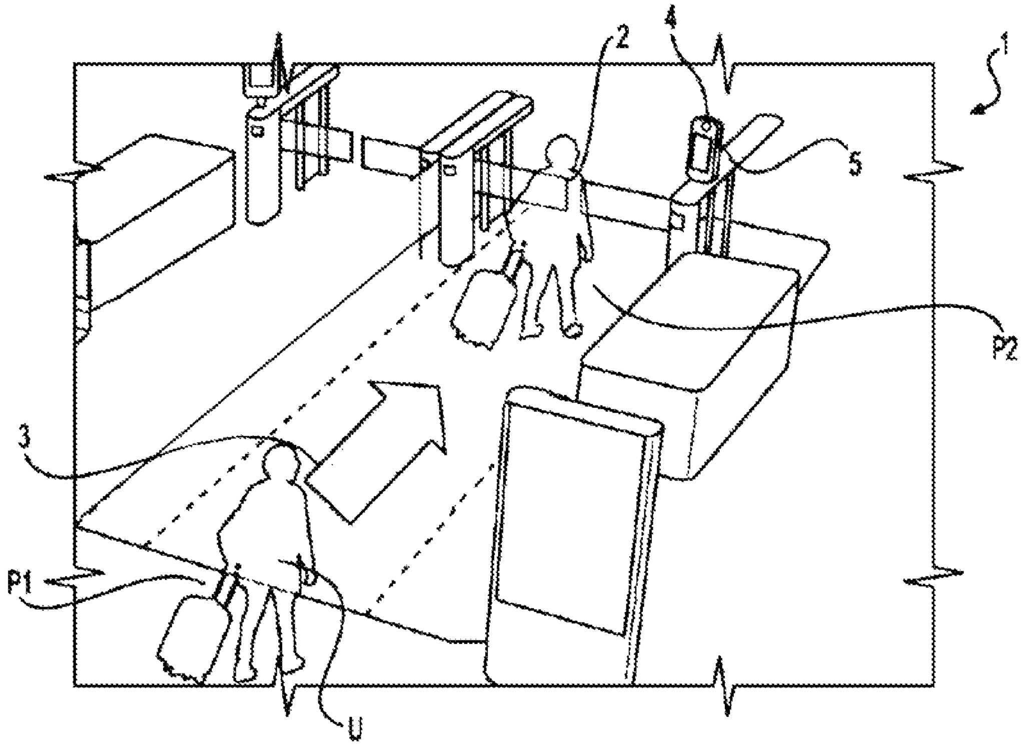
FIG. 1B illustrates an example of a gate apparatus according to an embodiment.

FIGS. 1A and 1B illustrate an example of a gate apparatus 1 according to a non-limiting example embodiment. As illustrated in FIG. 1A, the gate apparatus 1 may include a gate 2 provided in a passage way 3 for controlling traffic through the passage way 3. The gate apparatus 1 may further include a camera 4 and an information processing apparatus 5 for performing facial recognition of users walking through the passage way 3. According to other example embodiments, the information processing apparatus 5 may be referred to as an information processing device, an information processing system, an information processing terminal, etc.

According to an embodiment, the information processing apparatus 5 may obtain a first image of a person, or a user (U), at a first position P1, while the person approaches the gate 2. The first image may be captured at a first time (t1) by the camera 4. The first image may include one or more faces of people near the gate apparatus, each of the one or more faces corresponding to a user, among a plurality of users.

According to an embodiment, the information processing apparatus 5 may be configured to detect a first user, among a plurality of users, by performing a facial recognition operation on the faces in the first image. For instance, the facial recognition operation may be part of an authentication operation performed in whole or in part by the information processing apparatus 5, which is configured to authenticate the face of the user as a person authorized to pass through the gate, referred to as an authenticated user (U).

Figure 1C:
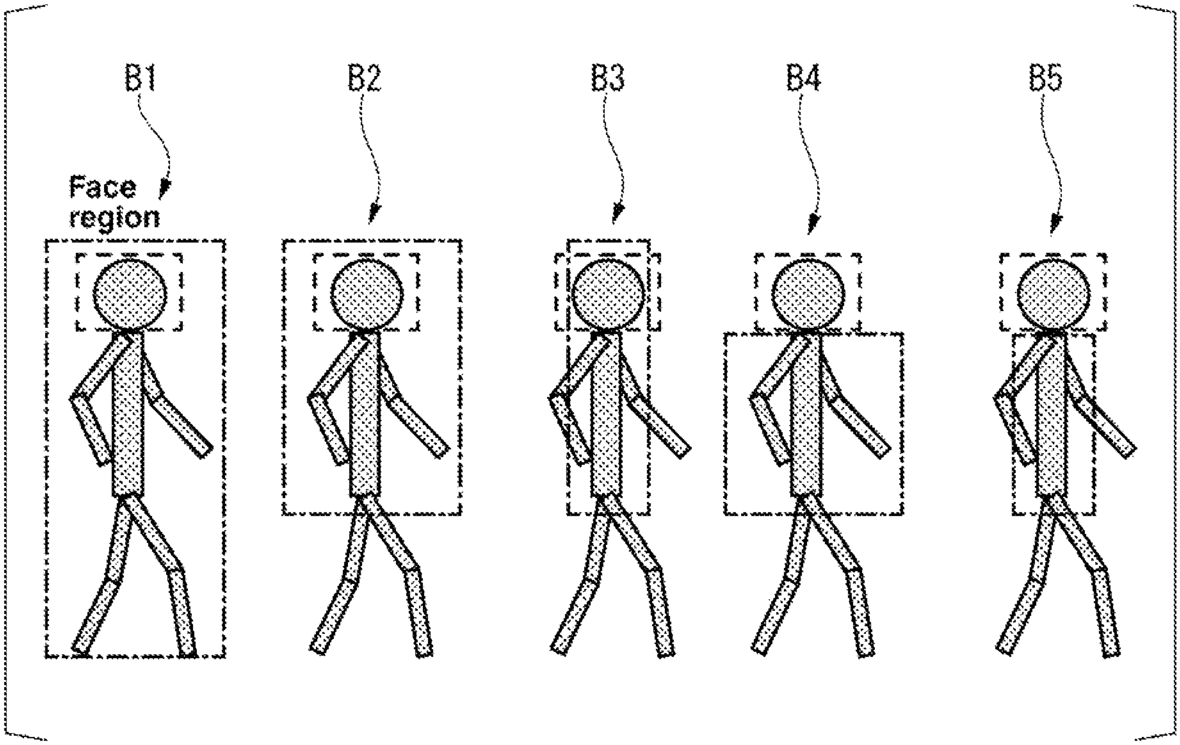
FIG. 1C illustrates examples of body regions according to an embodiment.

According to an embodiment, the information processing apparatus 5 may detect a region of the authenticated user's (U), as a body region, in the first image. According to various embodiments, the body region may correspond to different regions or combination of the different regions of the subject as illustrated in FIG. 1C. For instance, according to an embodiment, the body region may be the entire (whole) body of the subject (see reference symbol B1). According to other embodiments, the body region may be of one of a combination of the upper body portion and the head portion of the subject (see reference symbol B2), a combination the head portion and the torso portion of the subject (see reference symbol B3), a combination the torso portion and the arm portion of the subject (see reference symbol B4) or only the torso portion of the subject (see reference symbol B5).

According to an embodiment, the body region can be associated with the face region of the authenticated user (U). By associating the authenticated user's (U) body region with the corresponding face region, the authenticated user (U) can be tracked by tracking the body region. When the user is at a second position P2 in the passage way, a second image can be acquired by the camera 4. The second image may be captured at a second time (t2) subsequent to the first time (t1), and may be captured by the same camera 4 or by an image capturing device that is different from camera 4. The second image may contain the body region, but may not contain the face region of the authenticated user (U). This might be because of the authenticated user's (U) movement between time t1 and time t2, or it might be because the authenticated user's (U) face is not sufficiently facing the camera 4 at time t2, the face is obscured in the second image, or is not present in the second image at time t2. Since the body region is associated with the authenticated user (U), the authenticated user (U) can be tracked in the second image even though the face region might not be present in the second image. The information processing apparatus 5 may output information to control the gate 2 to be opened based on a determination the tracked body region is approaching the gate. In this manner, it is not necessary for the information processing apparatus 5 to repeatedly authenticate the user after the user has been authenticated as an authorized person. For instance, since the body region of the authenticated user is being tracked, the gate 2 may be opened even when the person in not facing the camera 4 at position P2.

In FIG. 1B, the information processing apparatus 5 can be configured to prevent the gate 1 from opening when the information processing apparatus 5 determines that the body region tracked in the second image at position P2 is not associated with a face region of a user authenticated in the first image. For instance, when the information processing apparatus 5 is unable to perform facial recognition operation on a face in the first image obtained from the camera 4, the information processing apparatus 5 may not track the body region corresponding to the face in the first image. Therefore, the information processing apparatus 5 does not open the gate 1 unless an additional facial recognition operation for the user is performed and the user authenticated.

Figure 2:
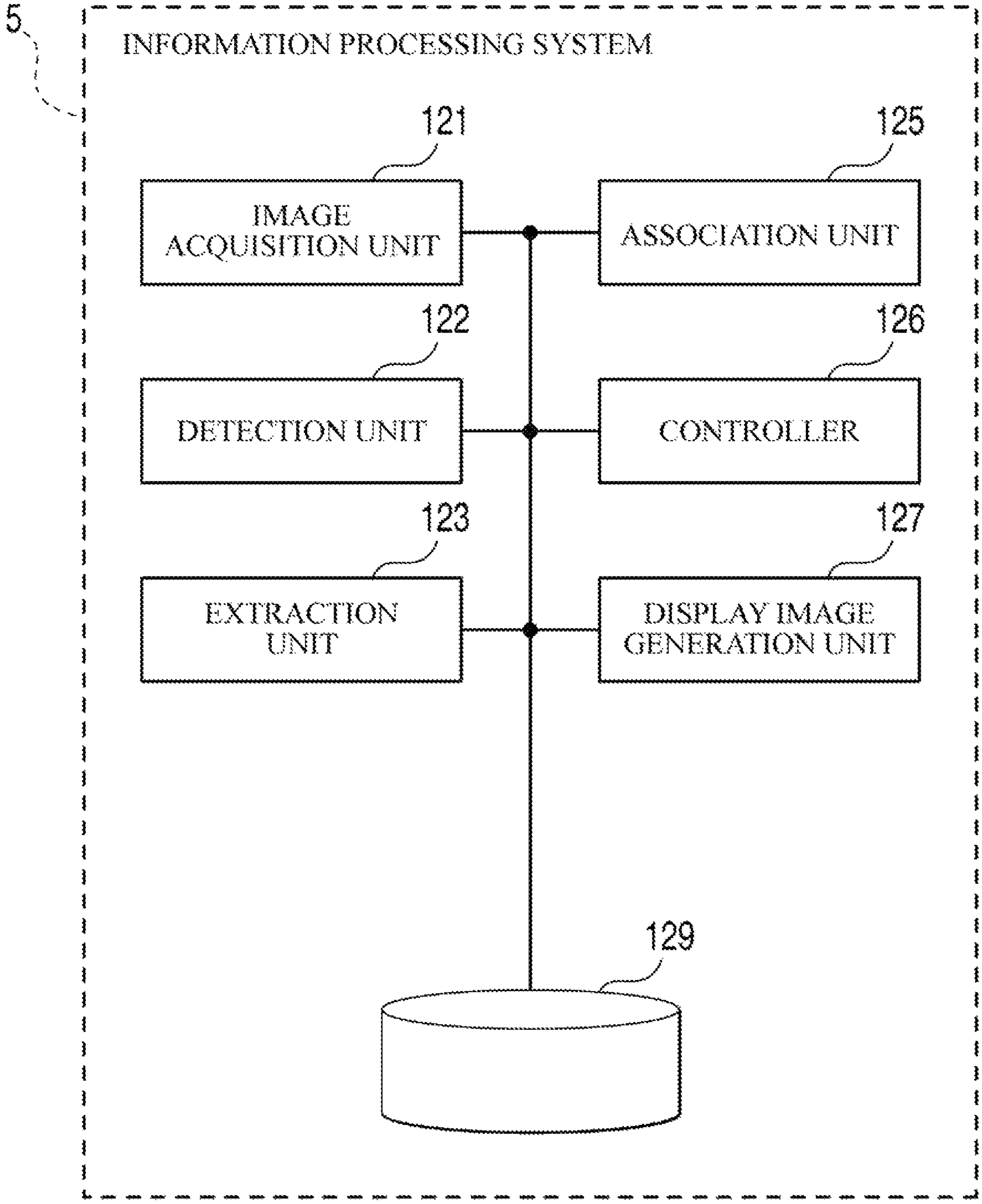
FIG. 2 is a function block diagram of an information processing apparatus 5 according to the embodiment.

FIG. 2 is a functional block diagram of an information processing apparatus 5 according to an example embodiment. The information processing apparatus 5 may be part of the gate apparatus 1. According to an embodiment, the information processing apparatus 5 may include one or more processors (such a CPU 102 in FIG. 9 or other processors) and a memory (such as RAM 104 in FIG. 9 or other memories). The information processing apparatus 5 may have an image acquisition unit 121, a detection unit 122, an extraction unit 123, an association unit 125, a controller 126, a display image generation unit 127 and a storage unit 129. According to an embodiment, the CPU 102 may execute one or more instructions stored in the memory to implement the various units. The units and the operations performed by the units are provided for illustration, but the disclosure is not limited to the units or the operations performed by the units. According to other embodiments, the novel features of the disclosure may be performed by various combinations of units, including units described above and other units.

According to an embodiment, the image acquisition unit 121 may obtain an image from a camera 4, the detection unit 122 may detect a person in the image obtained from camera 4, the extraction unit 123 may extract a feature, such as a facial feature and a body feature, in the image, the association unit 125 may associate the extracted facial feature and the body feature with each other, a controller 126 may control a gate 2 to be opened or closed, the display image generation unit 127 may generate information to be displayed on a display 110 (as shown in FIG. 9) and the storage unit 129 may store information.

Figure 3:
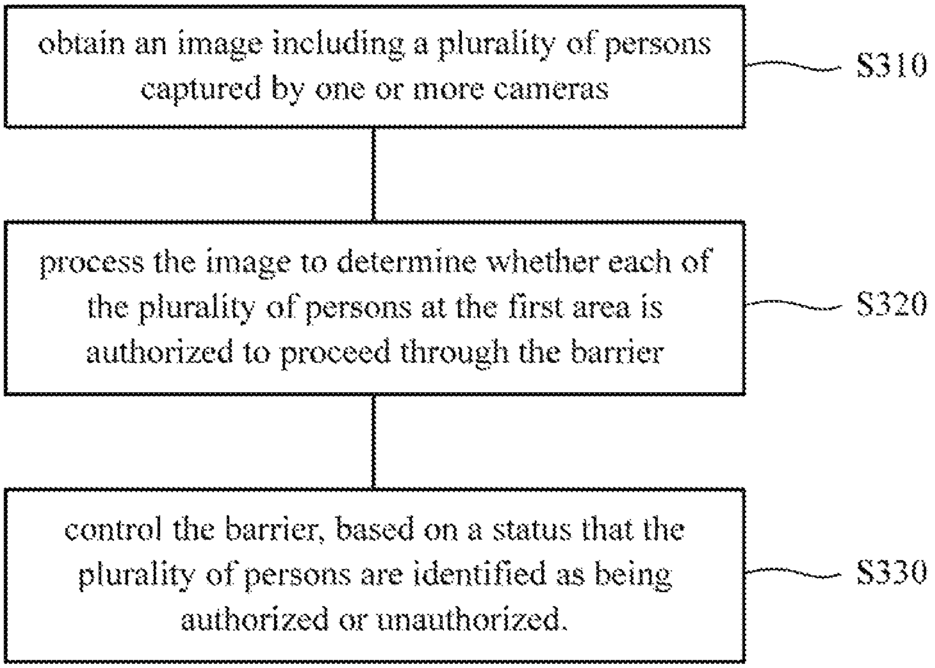
FIG. 3 is a flowchart illustrating an outline of a process performed by the information processing apparatus according to the embodiment.

FIG. 3 is a flowchart illustrating an overview of the process performed by the information processing apparatus 5 according to an example embodiment. With reference to FIGS. 1A, 1B and 2, the overview of the process performed by the information processing apparatus 5 will be described along the flowchart of FIG. 3.

Figure 4A:
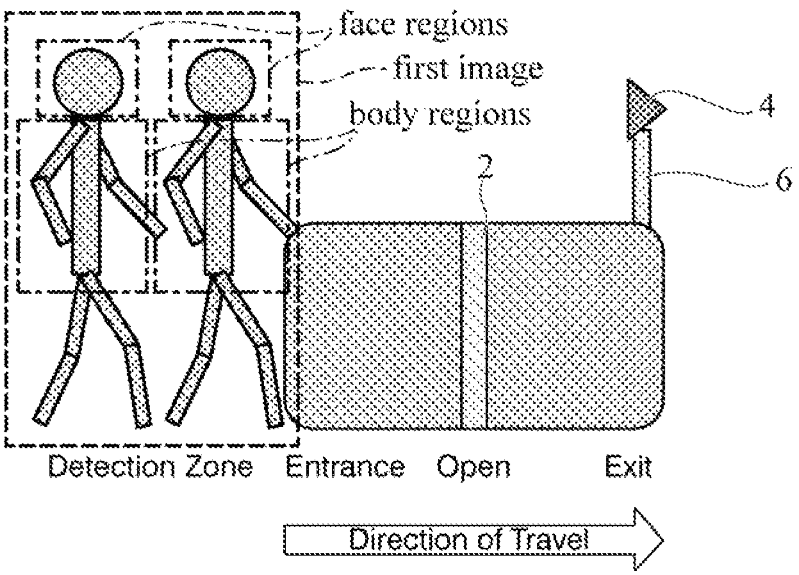
FIG. 4A illustrates an example of the process performed by the information processing apparatus according to the embodiment of FIG. 3.

In S310 of FIG. 3, the information processing apparatus 5 may obtain a first image including a plurality of subjects captured by the camera 4. According to an embodiment, the method of obtaining the first image may include the following operations performed by the image acquisition unit 121. For instance, the image acquisition unit 121 obtains the first image, in which, each of the plurality of subjects are present at a first area in advance of a gate 2 from the camera 4. This process may correspond to the illustration in FIG. 4A. FIG. 4A shows a camera 4 that is configured to capture a first image, in which, two subjects are present at the detection zone. FIG. 4A further shows a display 6 that is configured to display information. According to an embodiment, the detection zone may be an area in advance of the gate apparatus 1, that is captured by the camera 4, to identify if one or more persons are approaching the gate. According to an embodiment, the detection zone may be the first area.

According to another embodiment, the camera 4 may capture only one subject at the detection zone or the camera 4 may capture three or more subjects at the detection zone. The captured first image may be stored in the storage unit 129. According to an embodiment, the first image may include a face of a subject to be recognized. The subject may be approaching a gate 2 (shown in FIGS. 1A and 1B). According to another embodiment, the first image may include a plurality of faces, each of the plurality of faces corresponding to a subject, among a plurality of subjects to be recognized. According to an embodiment, the subject to be recognized may be a person.

In S320 of FIG. 3, the information processing apparatus 5 detects a person in the first image. This process corresponds to the illustration in FIG. 4A. According to an embodiment, the information processing apparatus 5 may detect the person by performing facial recognition on the first image. For instance, the information processing apparatus 5 may process the first image to determine whether each of the plurality of persons at the first area is authorized to proceed through the gate.

The method of performing facial recognition may include the following operations performed by the detection unit 122 and the extraction unit 123. For instance, the extraction unit 123 extracts one or more facial features from the first image obtained by the image acquisition unit 121, and the detection unit 122 obtains the one or more facial features extracted by the extraction unit 123 and detects whether each of the one or more facial feature matches a respective registered facial feature, among a plurality of registered facial features. Each of the plurality of registered facial features may correspond to a face of a person, among a plurality of persons previously registered. The registered facial features may be stored in a storage unit 129.

In S330, the information processing apparatus 5 may control the gate, based on a status that the plurality of persons are identified as being authorized or unauthorized. In the case where the plurality of persons are identified as being authorized at the first area in advance of a gate 2, the information processing apparatus 10 may control the gate to be opened (shown in FIG. 4A). According to another embodiment, the information processing apparatus 10 may control the gate to be opened in the case where the plurality of persons are identified as being authorized in the detection zone in advance of a gate 2, and where the information processing apparatus 10 does not detect any person in a gate zone by images captured by the camera 4 or other cameras.

According to an embodiment, the information processing apparatus 5 tracks a body region in a second image captured at a second time. According to an embodiment, the camera 4 or other cameras may capture one or more subjects in the second image in the gate zone. According to an embodiment, the gate 2 is closer to the gate zone than the detection zone. According to an embodiment, the gate zone may be an area in between the detection zone and a barrier of the gate apparatus 1. For instance, the gate zone may be the entrance of the gate apparatus.

Figure 4B:
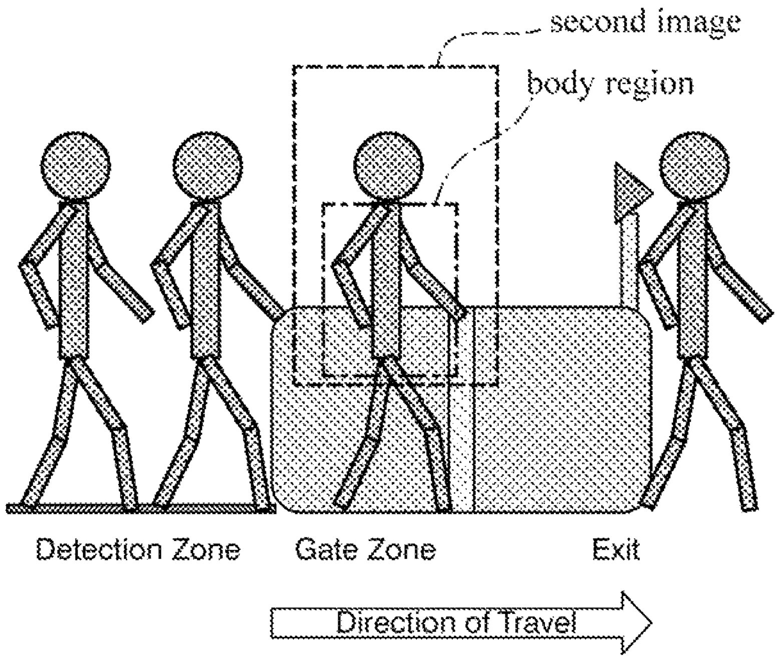
FIG. 4B illustrates an example of the process performed by the information processing apparatus according to the embodiment of FIG. 3.

According to an embodiment as illustrated in FIG. 4B, the information processing apparatus 5 may track the body region in the second image by associating a face region in the first image with a body region the first image, and matching the body region in the second image with the body region in the first image. According to an embodiment, the gate apparatus 1 may include a camera system having two or more cameras, i.e., a first camera and a second camera. According to an embodiment, the first camera may capture an image depicting one or more subjects in a first area and the second camera may capture an image depicting one or more subjects in a second area. The first area may be the detection zone and the second area may be the gate zone as illustrated in FIG. 4B, however, the first area and the second area are not limited thereto.

According to an embodiment, the method of performing body tracking may include the following operations performed by the image acquisition unit 121, the detection unit 122, the extraction unit 123 and the association unit 125. For instance, the extraction unit 123 may extract a body region of a subject in the first image. The operation of extracting the body region may be performed after the detection unit detects a match between the face feature in the first image with a registered face feature. According to another embodiment, the operation of extracting the body region may be performed before the detection unit detects a match between the face feature in the first image with a registered face feature or simultaneously while the detection unit detects a match between the face feature in the first image with a registered face feature.

According to an embodiment, the association unit 125 associates the extracted body region with the face region in the first image. For instance, the association unit 125 determines that the body region corresponds to the face region by analyzing one or more characteristics of the face region and the body region. For instance, when the association unit 125 determines that one or more characteristics of the face region is similar to one or more characteristics of the body region, the association unit 125 may associate the face region with the body region. According to another embodiment, the association unit 125 may determine that the body region corresponds to the face region based on a proximity of the face region to the body region.

Figure 5A:
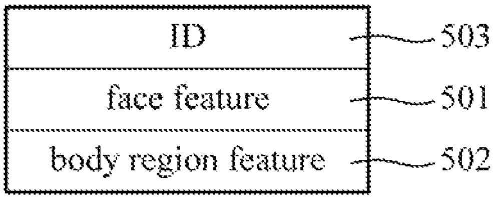
FIG. 5A is an example of data structures according to another embodiment.

According to an embodiment, the association unit may store the associated face region and body region in a storage unit 129. For instance, as illustrated in FIG. 5A, the storage unit 129 may store the face region and the body region in association with identification information of the detected person. The associated face region and body region may be temporarily stored in the storage unit 129.

According to an embodiment, the image acquisition unit 121 may obtain a second image captured by the camera 4 at a second time. The second time being different from the first time. According to an embodiment, the second time is after the first time. According to an embodiment, the second image may be captured by an image acquisition device, such as a camera, that is different from the camera capturing the first image.

According to an embodiment, the extraction unit 123 may extract a feature of the body region in the second image, and the detection unit 122 may obtain the feature of the body region in the second image from the extraction unit 123 and detect whether the feature of the body region in the second image matches a feature of body region stored in the storage unit 129. Accordingly, when there is a match between the body region in the second image and the body region obtained from the storage unit 129, the detection unit 122 may obtain the identification of the subject previously detected in the first image. Accordingly, the information processing apparatus 5 may track the subject using the body regions extracted in the first image and the second image.

According to an embodiment, in S330, the information processing apparatus 5 may output information to control the gate 2 based on tracked movement of the body regions corresponding to the one or more subjects. This process may correspond to the illustration in FIGS. 1A and 1B. According to an embodiment, the method of controlling the gate may be performed by a controller 126. For instance, the controller 126 may obtain information from the detection unit 122 indicating whether or not there is a match between the feature of the body regions corresponding to the one or more subjects in the second image and the feature of the body regions obtained from the storage unit 129.

According to an embodiment, in a case where there is a match, the controller 126 may output a control signal to open the gate 2 as illustrated in FIGS. 1A and 4B. According to an embodiment, when multiple subjects are identified, authorized and tracked, the information processing apparatus 5 may control the gate 2 to remain in an open state as illustrated in FIG. 4B. Accordingly, the gate apparatus 1 may allow faster throughput, and the users may have a free flow experience through the gate.

Figure 4C:
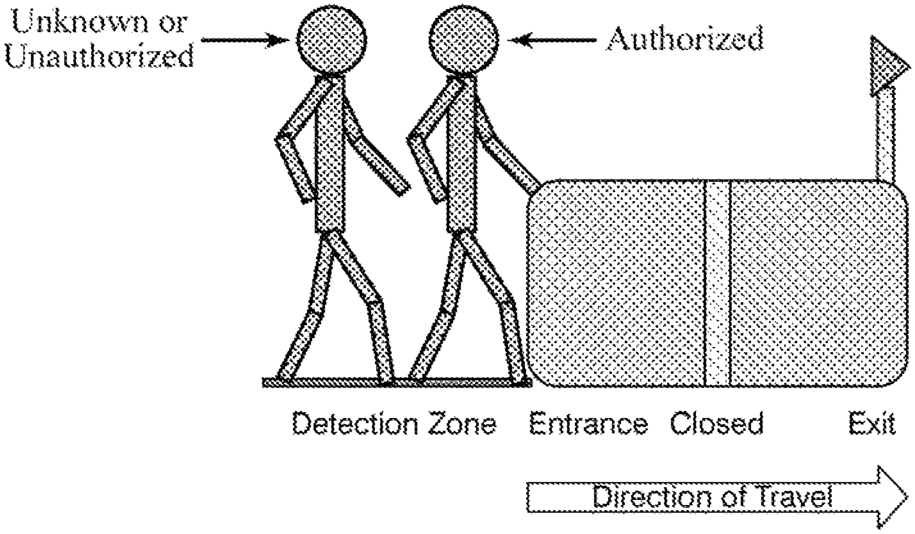
FIG. 4C illustrates an example of the process performed by the information processing apparatus according to the embodiment of FIG. 3.

On the other hand, in a case where there is no match with respect at least one of the subjects in the image captured in the detection zone, the controller 126 may maintain the gate 2 at a closed state as illustrated in FIG. 1B. For instance, according to an embodiment, if any one of the subjects in the image capture at the detection zone is not identified or is not authorized, the controller 126 may maintain the gate 2 at a closed state as illustrated in FIGS. 1B and 4C. In such a case, according to an embodiment, the information processing apparatus 5 may perform an authentication process on a third image captured at the gate zone, and control the gate to open or be closed based on the result of the authentication process.

Figure 4D:
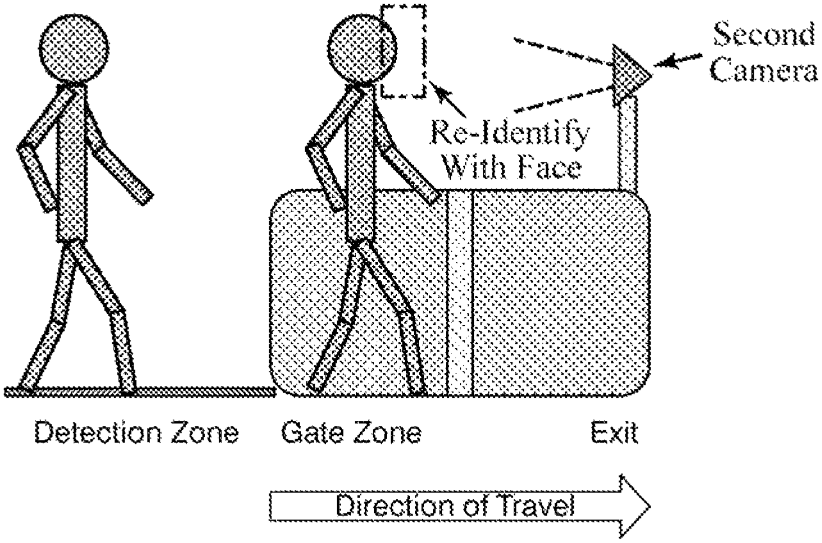
FIG. 4D illustrates an example of the process performed by the information processing apparatus according to the embodiment of FIG. 3.

According to an embodiment, the information processing apparatus 5 may capture a third image of a subject in the gate zone and perform a facial recognition operation on the face in the third image as illustrated in FIG. 4D. For instance, according to an embodiment, if any one of the subjects in the image capture at the detection zone is not identified or is not authorized, the image processing apparatus 5 may determine whether only one subject is present in the gate zone. When it is determined that only one subject is present in the gate zone, the image processing apparatus 5 may control a camera 4 to capture the third image of the subject in the gate zone. According to an embodiment, the camera capturing the third image may be different from the camera capturing the first image. The image processing system 5 may perform the facial recognition operation on the third image to identify and authorize the face in the third image. Accordingly, the image processing apparatus 5 may control the gate to open when the face in the third image is identified and authorized. In this case, the image processing apparatus 5 may perform identification and authorization on a subject twice. For instance, the image processing apparatus 5 may identify and authorize a subject at a first time in the detection zone, which included one or more other subjects, and when at least one of the one or more other subjects in the detection zone is not authorized, the image processing apparatus 5 may re-identify and re-authorize the subject, who was previously identified and authorized at the first time in the detection zone, at a second time in the gate zone. In other words, in the second area, the system authorizes the subject aside from first authorization of the same subject in the first area.

According to another embodiment, the image processing apparatus 5 may perform facial recognition, identification and authorization only one time in the first area. According to another embodiment, the image processing apparatus 5 may perform facial recognition, identification and authorization multiple times until the subject is identified. According to an embodiment, the image processing apparatus 10 may check whether only one subject is present in the gate zone or not and whether the subject at the gate zone was previously authorized in the first area or not. According to an embodiment, the image processing apparatus 5 may determine whether the subject at the gate zone was previously authorized in the first area or not using the body tracking operation illustrated in FIGS. 4A and 4B. Accordingly, the image processing apparatus 5 may control the gate to be opened in the case where only one subject is present in the gate zone and the subject in the gate zone has been previously authorized in the first area.

Figure 4E:
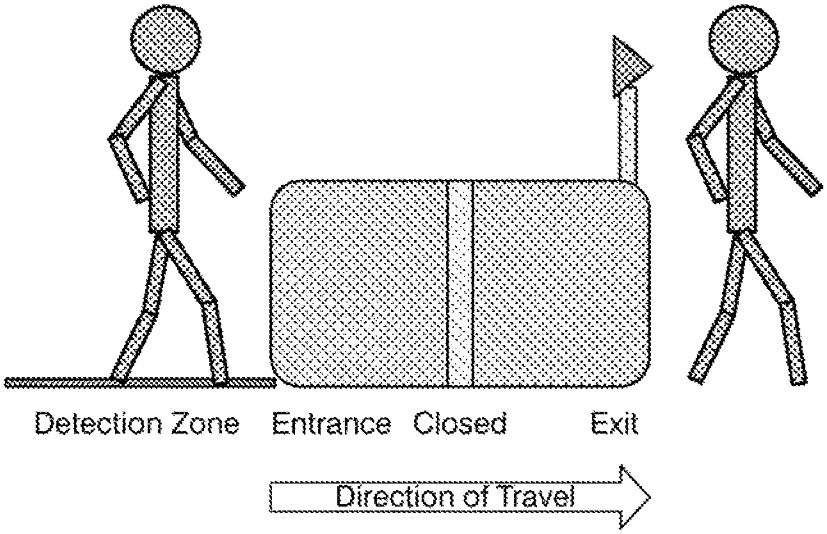
FIG. 4E illustrates an example of the process performed by the information processing apparatus according to the embodiment of FIG. 3.

According to an embodiment as illustrated in FIG. 4E, the image processing apparatus 5 may control the gate to be closed again once the subject in the gate zone has exited the gate zone through the gate. In this manner, the image processing apparatus 5 may process the next subject in the gate zone based re-identification and reauthorization or by body tracking. Thus, improved security is provided in a case where at least one subject, among the one or more subjects in the detection zone is not authorized.

FIG. 5A illustrates a data structure associating face feature information 501 and body features information 502 with each other. For instance, the face feature information 501 and body features information 502 may be associated with each other under an identification information 503 and stored in a storage unit 129. The identification information 503 may be used to further identify if the associated face feature information 501 and body features information 502 correspond to an authenticated person.

Figure 5B:
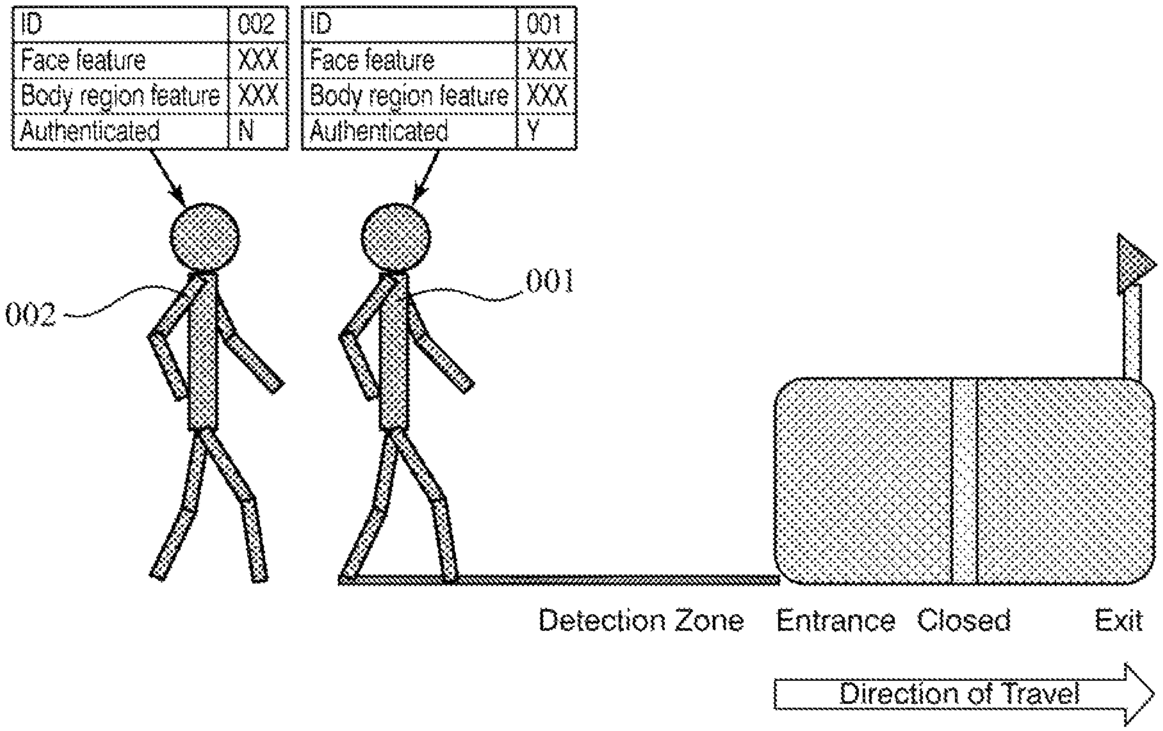
FIG. 5B is an example of data structures according to another embodiment.
Figure 5C:
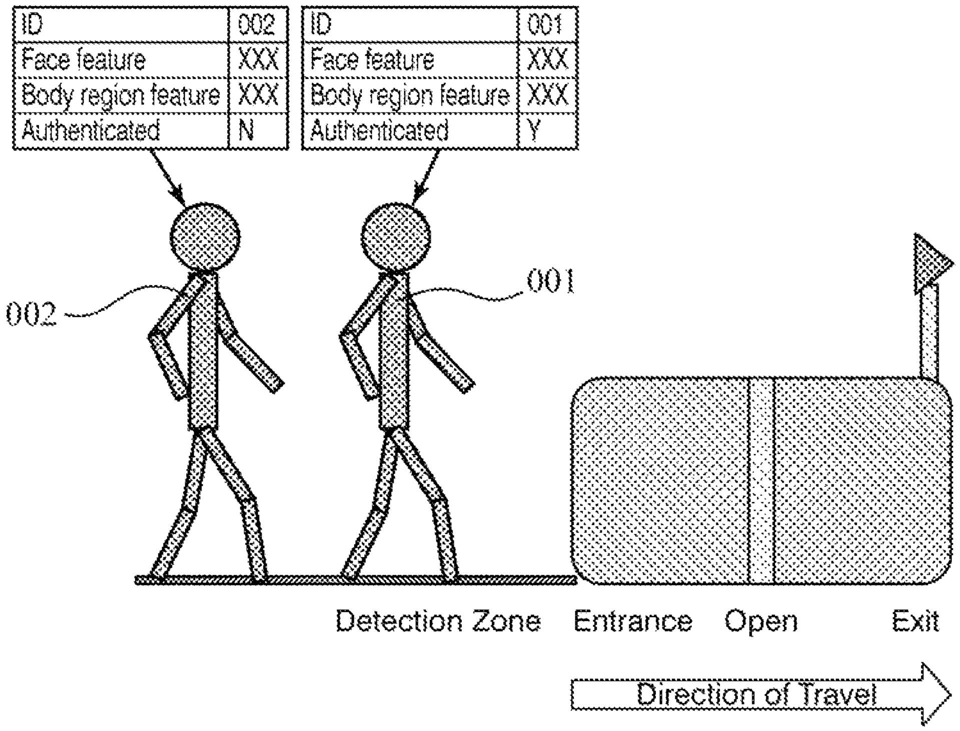
FIG. 5C is an example of data structures according to another embodiment.

FIGS. 5B and 5C illustrate a data structure associating face feature information, body features information and authentication information in association with each other. For instance, FIGS. 5B and 5C illustrate example scenarios of data stored in the data structure. FIG. 5B illustrates a first scenario, in which, a facial image of subject 001 is captured for facial recognition (i.e., subject 001 faces or looks at the camera), while a facial image of subject 002 is not captured for facial recognition (i.e., subject 002 looks down or away). In the first scenario, the authentication row of the data structure for subject 001 is indicated as "Y", indicating that subject 001 is authenticated, while the authentication row of the data structure for subject 002 is indicated as "N", indicating that subject 002 is not authenticated.

FIG. 5C illustrates a second scenario, in which, a facial image of subject 001 is captured for facial recognition (i.e., subject 001 faces or looks at the camera) and a facial image of subject 002 is captured for facial recognition (i.e., subject 002 faces or looks at the camera). In the second scenario, the authentication row of the data structure for subject 001 is indicated as "Y", indicating that subject 001 is authenticated, and the authentication row of the data structure for subject 002 is also indicated as "Y", indicating that subject 002 is also authenticated.

Figure 6:
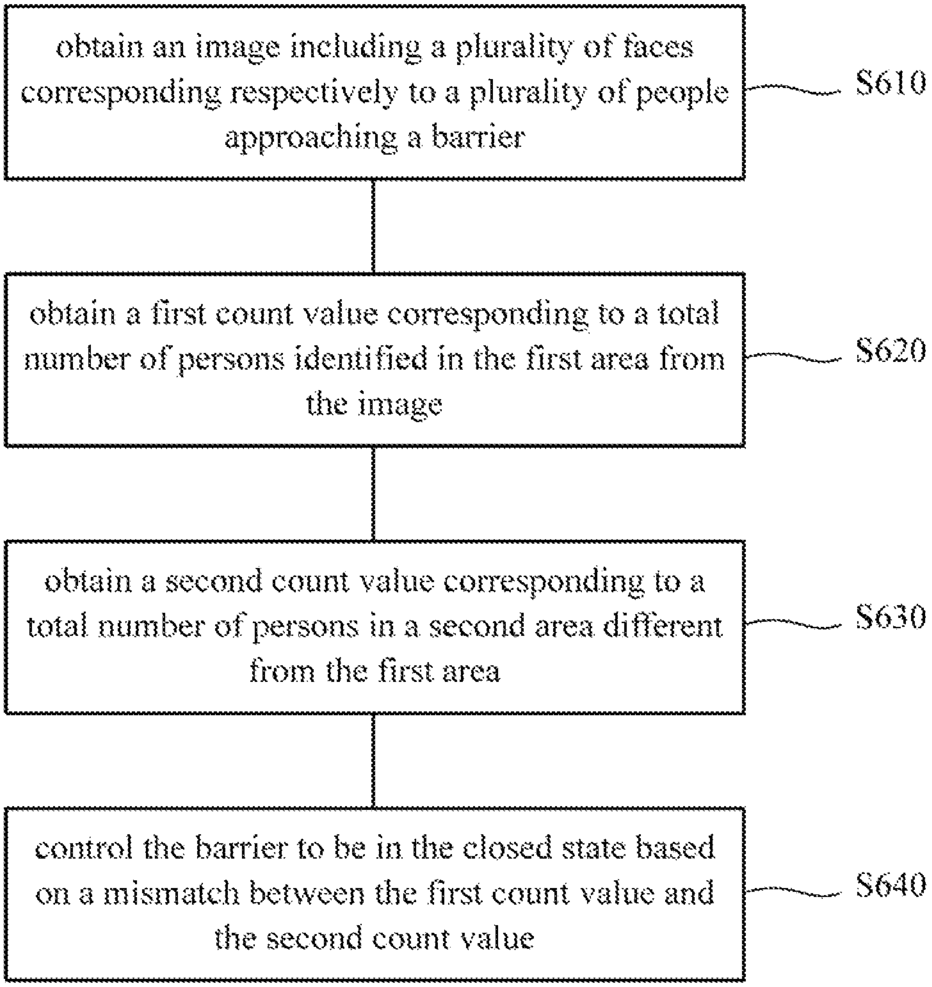
FIG. 6 is a flowchart illustrating a process performed by the information processing apparatus according to another embodiment.
Figure 7A:
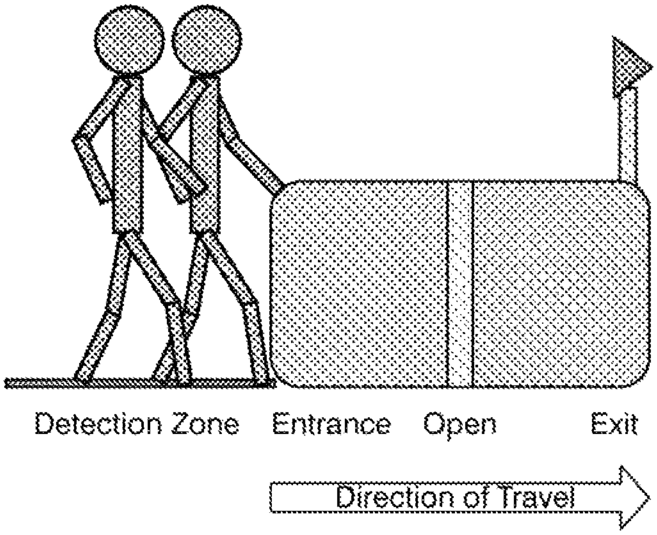
FIG. 7A illustrates an example of the process performed by the information processing apparatus according to the embodiment of FIG. 6.
Figure 7B:
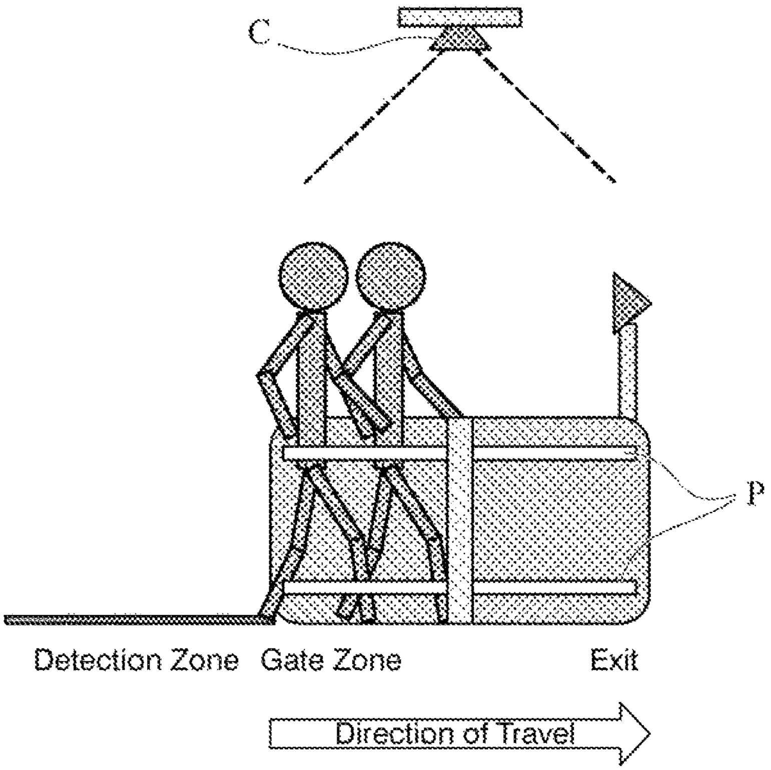
FIG. 7B illustrates an example of the process performed by the information processing apparatus according to the embodiment of FIG. 6.

FIG. 6 is a flowchart illustrating the outline of the process performed by the information processing apparatus 5 according to another example embodiment. With reference to FIGS. 7A and 7B, the outline of the process performed by the information processing apparatus 5 will be described along with the flowchart of FIG. 6.

In S610, the information processing apparatus 5 may obtain an image from a camera 4 (as shown in FIGS. 1A and 1B). According to an embodiment, the method of obtaining the image may include the following operations performed by the image acquisition unit 121. For instance, the image acquisition unit 121 may obtain the image from the camera 4. The obtained image may include a plurality of faces, each of the faces corresponding to a subject, among a plurality of subjects to be recognized. According to an embodiment, the subject to be recognized may be a person. This process may correspond to the illustration in FIG. 7A.

In S620 the information processing apparatus 5 may obtain a first count value corresponding to a total number of persons identified in the image. According to an embodiment, the first count value may be based on a number of faces identified in the image.

In S630, the information processing apparatus 5 may obtain a second count value corresponding to a total number of persons in a second area different from the first area. As illustrated in FIG. 7B, the second count may be obtained from an overhead people counter C or from sensors (photoelectric beam sensors P) provided on the sides of the gate entrance in the gate zone. The overhead people counter C may be a camera or other sensors.

In S640, the information processing apparatus 5 may control the barrier to be in the closed state based on a mismatch between the first count value and the second count value. According to an embodiment, the information processing apparatus 5 may output an alert indicating that there is a gate zone irregularity.

According to another embodiment, the information processing apparatus 5 may control the barrier to be in the closed state based on determination that more than one person are in the gate zone. For instance, if the second count value is determined to 2 or more, the information processing apparatus 5 may control the barrier to be in the closed state. In this case, the information processing apparatus 5 may obtain the first count value or may not determine if there is a mismatch between the first count value and the second count value.

According to another embodiment, the information processing apparatus 5 may control the barrier to be in the closed state based on a determination that one or more person has cut in line. For instance, in an example scenario illustrated in FIG. 7C, the information processing apparatus 5 may obtain a first total count value corresponding to a total number of persons identified in the image at a first time (T1). According to an embodiment, the first count value may be based on a number of faces identified in the image at time T1.

Figure 7C:
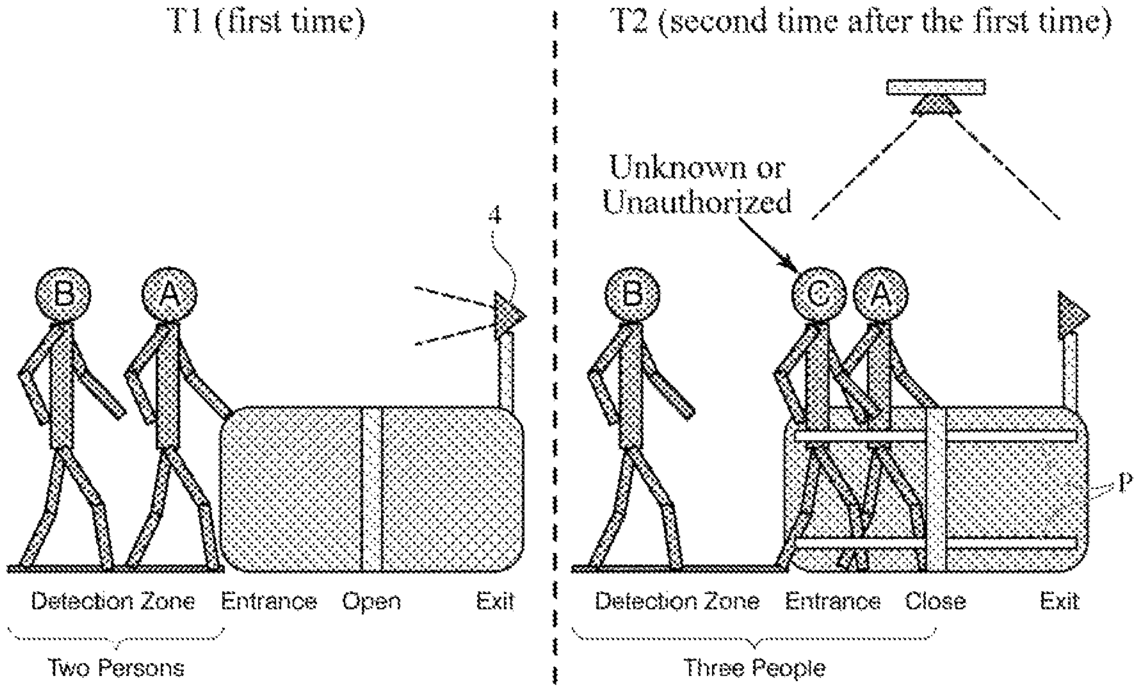
FIG. 7C illustrates an example of the process performed by the information processing apparatus according to the embodiment of FIG. 6.

Thereafter, at time T2, the information processing apparatus 5 may obtain a second total count value corresponding to a total number of persons in first area and in the second area different from the first area. As illustrated in FIG. 7C, the second count may be a total value obtained from the gate zone and the detection zone. For instance, the count value at the gate zone may be obtained from the overhead people counter (Camera) or from the sensors provided on the sides of the gate entrance in the gate zone. Also, the count value from the detected zone may be obtained from the camera. In this case, the count value from the detected zone may only include person authenticated or authorized from the image in the first time T1.

After obtaining the second total count value, the information processing apparatus 5 may control the barrier to be in the closed state based on a mismatch between the first total count value and the second total count value. According to an embodiment, the information processing apparatus 5 may output an alert indicating that there is a gate zone irregularity.

Figure 8:
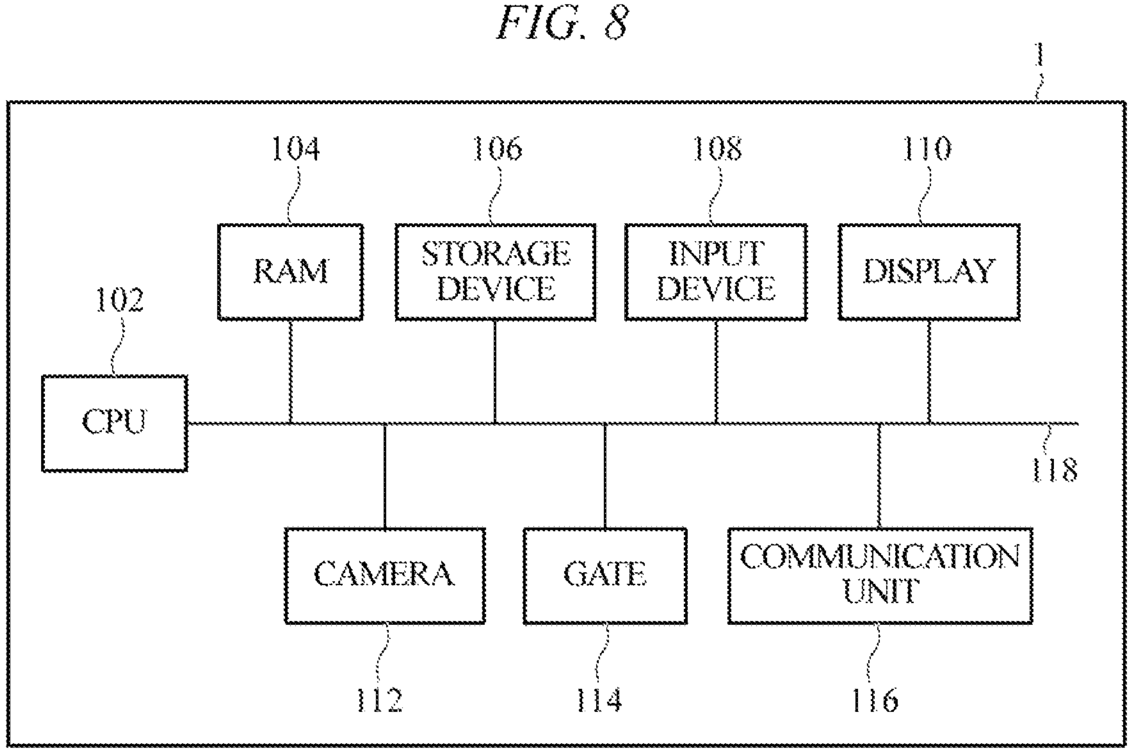
FIG. 8 is a block diagram illustrating an example of a hardware configuration of a gate control apparatus 1 according to an example embodiment.

As illustrated in FIG. 8, the gate apparatus 1 has a CPU 102, a RAM 104, a storage device 106, an input device 108, a display 110, a camera 112, a gate 114, and a communication unit 116. The CPU 102, the RAM 104, the storage device 106, the input device 108, the display 110, the camera 112, the gate 114, and the communication unit 116 are connected to a bus line 118.

The CPU 102 may function as a control unit that operates by executing a program stored in the storage device 106 and controls the operation of the entire gate apparatus 1. Further, the CPU 102 may execute an application program stored in the storage device 106 to perform various processes as the gate apparatus 1. The RAM 104 may provide a memory field necessary for the operation of the CPU 102.

The storage device 106 may be formed of a storage medium such as a non-volatile memory, a hard disk drive, or the like and functions as a storage unit. The storage device 106 may store a program executed by the CPU 102, data referenced by the CPU 102 when the program is executed, or the like.

The input device 108 may be a touchscreen embedded in the display 110, for example. The input device 108 may function as an input unit that accepts input from a user.

The display 110 may function as a display unit that displays various windows to a user using the gate apparatus 1. For example, the display 110 may display a guidance window showing how to use the gate apparatus 1, a notification window to the user, or the like.

The camera 112 may capture an image of a person or a plurality of persons. The image may include a face region and a body region of the person or persons. For example, the camera 112 may be a digital camera that captures a front area of the gate apparatus 1, and when detecting a face of the user standing in front of the gate apparatus 1 in an image captured continuously or periodically, captures the face of the user 1 and acquires the face image thereof.

According to an embodiment, when identity verification of the person is successful in the gate apparatus 1, the gate 114 changes from a closed state for a standby mode to block passage of the person to an opened state to permit the person to pass through the passage. The scheme of the gate 114 is not particularly limited and may be, for example, a flapper gate in which one or more flappers provided on one side or both side of the passage are opened or closed, a turn-style gate in which three bars are revolved, or the like.

The communication unit 116 may be connected to a network and may transmit and receive data via the network. The communication unit 116 communicate with a server or the like under the control of the CPU 102.

The disclosure is not limited to the example embodiments described above but can be changed as appropriate within a range not departing from the spirit of the disclosure.

While the information processing apparatus and systems used in facial recognition for gate control have been illustrated as examples in each of the above example embodiments, the disclosure is also applicable to areas of facial recognition and body tracking other than gate control by appropriately changing the configuration of the one or more example embodiments.

The scope of one or more example embodiments also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service implemented by the function of one or more example embodiments described above can be provided to the user in a form of Software as a Service (Saas).

Note that all the example embodiments described above are mere examples of embodiments in implementing the disclosure, and the technical scope of the disclosure should not be construed in a limiting sense by these example embodiments. That is, the disclosure can be implemented in various forms without departing from the technical concept thereof or the primary feature thereof.

A part or all of the exemplary embodiment described above can be written as in the supplementary notes below, but is not limited thereto.

(Supplementary Note 1)

A system comprising:

a memory storing one or more instructions; and a processor configured to execute the one or more instructions to:

obtain an image including a plurality of persons captured by one or more cameras, each of the plurality of persons present at a first area in advance of a barrier;

process the image to determine whether each of the plurality of persons at the first area is authorized to proceed through the barrier; and control the barrier, based on a status that the plurality of persons are identified as being authorized or unauthorized.

(Supplementary Note 2)

The system according to supplementary note 1, wherein the processor is further configured to execute the one or more instructions to:

control the barrier, based on a determination that all of the plurality of persons are identified as being authorized, to be in an open state.

(Supplementary Note 3)

The system according to supplementary note 1, wherein the processor is further configured to execute the one or more instructions to:

detect a first person, among the plurality of persons, by performing a facial recognition operation on the plurality of persons in the image captured at a first time from the one or more cameras;

detect a first body region corresponding to a first face region of the first person;

detect a second person, among the plurality of persons, by performing the facial recognition operation on the plurality of persons in the image;

detect a second body region corresponding to a second face region of the second person;

track the first body region and the second body region in another image captured by the one or more cameras at a second time subsequent to the first time; and control the barrier to remain open based on a determination that the first body region or the second body region is approaching the barrier.

(Supplementary Note 4)

The system according to supplementary note 1, wherein the processor is further configured to execute the one or more instructions to:

control the barrier, based on a determination that at least one the plurality of persons is identified as being unauthorized, to be in a closed state.

(Supplementary Note 5)

The system according to supplementary note 4, wherein the processor is further configured to execute the one or more instructions to:

detect a first person, among the plurality of persons, by performing a facial recognition operation on the plurality of persons in the image captured at a first time from the one or more cameras;

detect a first body region corresponding to a first face region of the first person;

detect a second person, among the plurality of persons, by performing the facial recognition operation on the plurality of persons in the image obtained from the one or more cameras;

obtain another image of the first person at a second area based on the second person being identified as an unauthorized person, the second area being between the first area and the barrier;

control the barrier to be in the open state based on the first person in the another image being identified as authorized by performing the facial recognition operation on the first person in the another image.

(Supplementary Note 6)

The system according to supplementary note 5, wherein the image corresponding to the first area is captured by a first camera, among the one or more cameras, and the another image corresponding to the second area is captured by a second camera, among the one or more cameras.

(Supplementary Note 7)

The system according to supplementary note 1, wherein the processor is further configured to execute the one or more instructions to:

obtain a first count value corresponding to a total number of persons identified in the first area from the image;

obtain a second count value corresponding to a total number of persons in a second area different from the first area; and control the barrier to be in the closed state based on a mismatch between the first count value and the second count value.

(Supplementary Note 8)

The system according to supplementary note 1, wherein the processor is further configured to execute the one or more instructions to:

determine a number of persons at a second area, the second area being closer than the first area to the barrier;

determine, based on the number of persons being one, whether the one person at the second area is authorized to proceed through the barrier; control the barrier, based on a status that the one person as being authorized or unauthorized; and control the barrier to be closed based on the number of persons not being one.

(Supplementary Note 9)

The system according to supplementary note 1, wherein the processor is further configured to execute the one or more instructions to:

determine a number of persons at a second area, the second area being closer than the first area to the barrier; and determine, based on the number of persons being one, whether the one person at the second area was previously authorized to proceed through the barrier while at the first area;

control the barrier, based on the one person being previously authorized to proceed through the barrier while at the first area; and control the barrier to be closed based on the number of persons not being one.

(Supplementary Note 10)

The system according to supplementary note 1, further comprising:

the barrier; and the one or more cameras.

(Supplementary Note 11)

A method of controlling a barrier comprising:

obtaining an image including a plurality of persons captured by one or more cameras, each of the plurality of persons present at a first area in advance of the barrier;

processing the image to determine whether each of the plurality of persons at the first area is authorized to proceed through the barrier; and controlling the barrier, based on a status that the plurality of persons are identified as being authorized or unauthorized.

(Supplementary Note 12)

The method according to supplementary note 11, wherein the controlling the barrier further comprises:

controlling the barrier, based on a determination that all of the plurality of persons are identified as being authorized, to be in an open state.

(Supplementary Note 13)

The method according to supplementary note 11, further comprising:

detecting a first person, among the plurality of persons, by performing a facial recognition operation on the plurality of persons in the image captured at a first time from the one or more cameras;

detecting a first body region corresponding to a first face region of the first person;

detecting a second person, among the plurality of persons, by performing the facial recognition operation on the plurality of persons in the image;

detecting a second body region corresponding to a second face region of the second person;

tracking the first body region and the second body region in another image captured by the one or more cameras at a second time subsequent to the first time; and controlling the barrier to remain open based on a determination that the first body region or the second body region is approaching the barrier.

(Supplementary Note 14)

The method according to supplementary note 11, wherein the controlling the barrier further comprises:

controlling the barrier, based on a determination that at least one the plurality of persons is identified as being unauthorized, to be in a closed state.

(Supplementary Note 15)

The method according to supplementary note 14, further comprising:

detecting a first person, among the plurality of persons, by performing a facial recognition operation on the plurality of persons in the image captured at a first time from the one or more cameras;

detecting a first body region corresponding to a first face region of the first person;

detecting a second person, among the plurality of persons, by performing the facial recognition operation on the plurality of persons in the image obtained from the one or more cameras;

obtaining another image of the first person at a second area based on the second person being identified as an unauthorized person, the second area being between the first area and the barrier; and controlling the barrier to be in the open state based on the first person in the another image being identified as authorized by performing the facial recognition operation on the first person in the another image.

(Supplementary Note 16)

A computer readable medium having stored thereon one or more instructions to perform a method of controlling a barrier comprising:

obtaining an image including a plurality of persons captured by one or more cameras, each of the plurality of persons present at a first area in advance of the barrier;

processing the image to determine whether each of the plurality of persons at the first area is authorized to proceed through the barrier; and controlling the barrier, based on a status that the plurality of persons are identified as being authorized or unauthorized.

(Supplementary Note 17)

The computer readable medium according to supplementary note 16, wherein the controlling the barrier further comprises:

controlling the barrier, based on a determination that all of the plurality of persons are identified as being authorized, to be in an open state.

(Supplementary Note 18)

The computer readable medium according to supplementary note 16, further comprising:

detecting a first person, among the plurality of persons, by performing a facial recognition operation on the plurality of persons in the image captured at a first time from the one or more cameras;

detecting a first body region corresponding to a first face region of the first person;

detecting a second person, among the plurality of persons, by performing the facial recognition operation on the plurality of persons in the image;

detecting a second body region corresponding to a second face region of the second person;

tracking the first body region and the second body region in another image captured by the one or more cameras at a second time subsequent to the first time; and controlling the barrier to remain open based on a determination that the first body region or the second body region is approaching the barrier.

(Supplementary Note 19)

The computer readable medium according to supplementary note 16, wherein the controlling the barrier further comprises:

controlling the barrier, based on a determination that at least one the plurality of persons is identified as being unauthorized, to be in a closed state.

(Supplementary Note 20)

The computer readable medium according to supplementary note 19, further comprising:

detecting a first person, among the plurality of persons, by performing a facial recognition operation on the plurality of persons in the image captured at a first time from the one or more cameras;

detecting a first body region corresponding to a first face region of the first person;

detecting a second person, among the plurality of persons, by performing the facial recognition operation on the plurality of persons in the image obtained from the one or more cameras;

obtaining another image of the first person at a second area based on the second person being identified as an unauthorized person, the second area being between the first area and the barrier; and controlling the barrier to be in the open state based on the first person in the another image being identified as authorized by performing the facial recognition operation on the first person in the another image.

This application is based upon and claims the benefit of priority from U.S. provisional patent application No. 63/006,475, filed Apr. 7, 2020, the disclosure of which is incorporated herein in its entirety.

What is claimed is:

1. A system comprising:

a memory storing one or more instructions; and a processor configured to execute the one or more instructions to:

obtain an image including a plurality of persons captured by one or more cameras, each of the plurality of persons present at a first area in advance of a barrier;

process the image to determine whether each of the plurality of persons at the first area is authorized to proceed through the barrier;

detect a first person, among the plurality of persons, by performing a facial recognition operation on the plurality of persons in the image captured at a first time from the one or more cameras;

detect a first body region corresponding to a first face region of the first person;

detect a second person, among the plurality of persons, by performing the facial recognition operation on the plurality of persons in the image;

detect a second body region corresponding to a second face region of the second person;

track the first body region and the second body region in another image captured by the one or more cameras at a second time subsequent to the first time; and control the barrier to remain open based on a determination that the first body region or the second body region is approaching the barrier.

2. The system according to claim 1, wherein the processor is further configured to execute the one or more instructions to:

control the barrier, based on a determination that at least one of the plurality of persons is identified as being unauthorized, to be in a closed state.

3. The system according to claim 1, further comprising:

the barrier; and the one or more cameras.

4. A method of controlling a barrier comprising:

obtaining an image including a plurality of persons captured by one or more cameras, each of the plurality of persons present at a first area in advance of the barrier;

processing the image to determine whether each of the plurality of persons at the first area is authorized to proceed through the barrier;

detecting a first person, among the plurality of persons, by performing a facial recognition operation on the plurality of persons in the image captured at a first time from the one or more cameras;

detecting a first body region corresponding to a first face region of the first person;

detecting a second person, among the plurality of persons, by performing the facial recognition operation on the plurality of persons in the image;

detecting a second body region corresponding to a second face region of the second person;

tracking the first body region and the second body region in another image captured by the one or more cameras at a second time subsequent to the first time; and controlling the barrier to remain open based on a determination that the first body region or the second body region is approaching the barrier.

5. The method according to claim 4, wherein the controlling the barrier further comprises:

controlling the barrier, based on a determination that at least one of the plurality of persons is identified as being unauthorized, to be in a closed state.

6. A non-transitory computer readable medium having stored thereon one or more instructions to perform a method of controlling a barrier comprising:

obtaining an image including a plurality of persons captured by one or more cameras, each of the plurality of persons present at a first area in advance of the barrier;

processing the image to determine whether each of the plurality of persons at the first area is authorized to proceed through the barrier; and detecting a first person, among the plurality of persons, by performing a facial recognition operation on the plurality of persons in the image captured at a first time from the one or more cameras;

detecting a first body region corresponding to a first face region of the first person;

detecting a second person, among the plurality of persons, by performing the facial recognition operation on the plurality of persons in the image;

detecting a second body region corresponding to a second face region of the second person;

tracking the first body region and the second body region in another image captured by the one or more cameras at a second time subsequent to the first time; and controlling the barrier to remain open based on a determination that the first body region or the second body region is approaching the barrier.

7. The computer readable medium according to claim 6, wherein the controlling the barrier further comprises:

controlling the barrier, based on a determination that at least one of the plurality of persons is identified as being unauthorized, to be in a closed state.

* * * * *